(No Model.)

R. B. RICHER & O. A. ADAMS.
SAW SWAGE.

No. 388,221. Patented Aug. 21, 1888.

Witnesses.
A. Ruppert,
H. A. Daniels.

Inventor.
R. B. Richer.
O. A. Adams.
Per
Thomas P. Simpson.
Atty.

UNITED STATES PATENT OFFICE.

RENSELAER B. RICHER AND OSCAR A. ADAMS, OF LAKEVIEW, MICHIGAN.

SAW-SWAGE.

SPECIFICATION forming part of Letters Patent No. 388,221, dated August 21, 1888.

Application filed January 5, 1888. Serial No. 259,832. (No model.)

*To all whom it may concern:*

Be it known that we, RENSELAER B. RICHER and OSCAR A. ADAMS, citizens of the United States, residing at Lakeview, in the county of Montcalm and State of Michigan, have invented certain new and useful Improvements in Saw-Swages; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a saw-tooth swage so that it will allow the die to work entirely on the under side of the tooth and thereby avoid all liability to split or crack the tooth.

Figure 1:
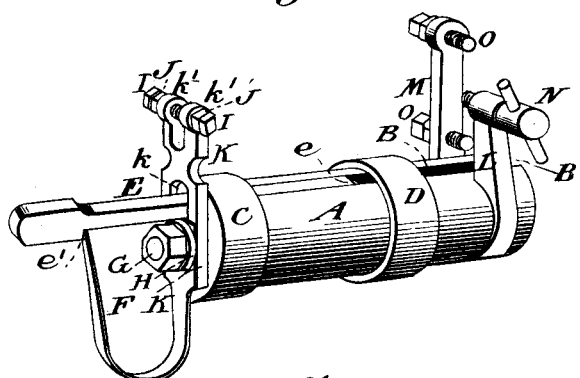
Figure 2:
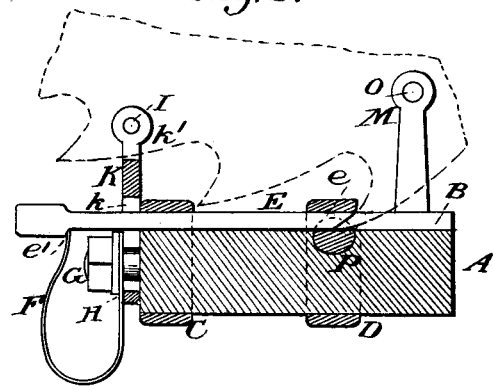
Figure 3:
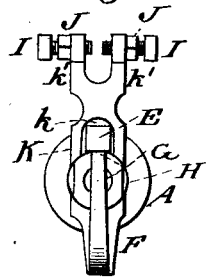

Figure 1 of the drawings is an elevation in perspective of my swage without the saw; Fig. 2, a longitudinal vertical section showing the relative position of the die, saw-tooth, and band after the former has been driven "home." Fig. 3 is an end elevation.

In the drawings, A represents a solid cylinder in which is made a longitudinal groove, B, from end to end.

C is a metallic band shrunk upon one end of the cylinder, while near the other end thereof the band D is shrunk on.

E is a swaging die which reciprocates in the groove B, under the bands C D, being driven in by the blow of a hammer, and retracted by a spring, F. The die E is beveled at $e$ on its front end to enable it to run under the saw-tooth, hammer-headed on its rear end, and shouldered at $e'$ to receive one end of the plate-spring F. The screw G passes through a hole in one end of the spring, and with a washer, H, holds it to the end of the cylinder.

K is an upright slotted at $k$ to make it adjustable, and held by the screw G, while its arms $k' k'$ are provided with female threads or nuts to receive screws I I, on which are secured the jam-nuts J J, whereby the raised part of the blade is clamped and maintained in position. By raising or lowering the upright K the pitch of the tooth may be regulated.

L M are two parallel uprights made fast to the opposite end of the cylinder so as to clamp the saw-blade above the tooth which is about to be swaged by means of the screws N O O, which pass through suitable nuts made in the uprights. The end of the tooth which is about to be swaged passes under the band D and rests upon the anvil P, which is arranged across the groove B and so as to form a part of the bottom of the groove.

The operation is as follows: The die is struck with a hammer and driven up under the tooth, as shown in Fig. 2 of the drawings, and is then retracted by its spring. This is repeated until the tooth has been properly shaped.

Having thus described all that is necessary to a full understanding of our invention, what we claim as new, and desire to protect by Letters Patent, is—

1. The solid cylinder A, having the longitudinal groove $a$, the anvil P, arranged on the bottom of said groove, the bands C D, and the end-beveled die E, in combination with suitable mechanism for holding the saw-blade, as and for the purpose set forth.

2. In a saw-tooth swage, the combination of a cylinder, A, with fixed uprights at one end, adjustable upright at the other, and clamp screws and nuts to hold the saw-blade adjustably, as described.

In testimony whereof we affix our signatures in presence of two witnesses.

RENSELAER B. RICHER.
OSCAR A. ADAMS.

Witnesses:
DANIEL W. MARTIN,
CARY VINING.